April 3, 1951 H. E. CRAIG 2,547,258
CAN OPENER
Filed June 2, 1947
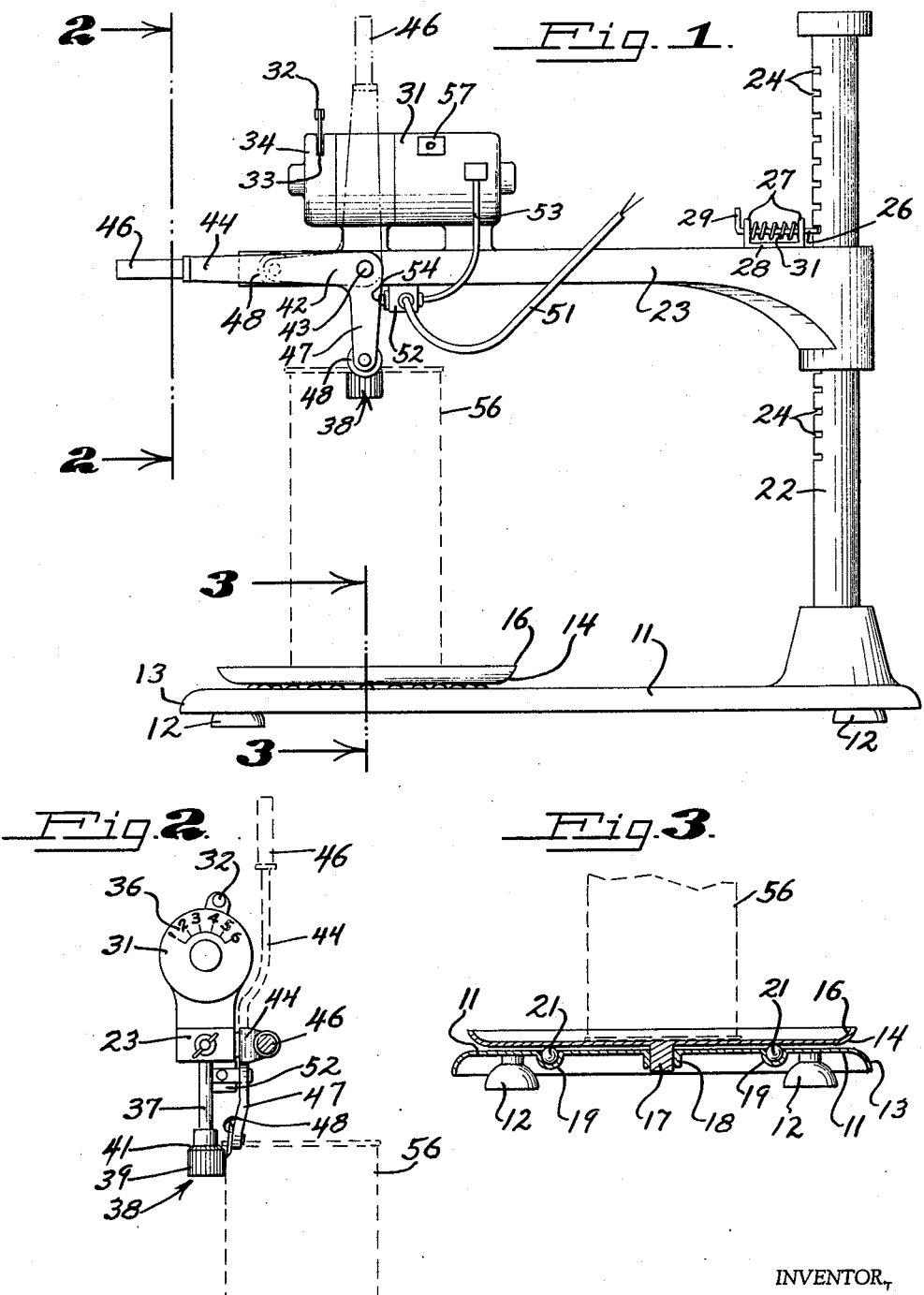
INVENTOR,
HALLETT E. CRAIG.
BY Stephen S. Townsend
ATTORNEY.

Patented Apr. 3, 1951

2,547,258

UNITED STATES PATENT OFFICE 2,547,258

CAN OPENER

Hallett E. Craig, Pittsburg, Calif., assignor to Minerva Hennings Craig, Pittsburg, Calif.

Application June 2, 1947, Serial No. 751,916

1 Claim. (Cl. 30—4)

This invention relates to appliances useful in the kitchen, and, more particularly, to can openers, although, as will appear hereinafter, parts thereof are useful also for driving egg beaters, meat grinders, and other devices.

An object of this invention is to provide a kitchen device which will begin to operate as soon as the parts are in operative relation, to continue to do so as long as such relation exists, and to cease such operation when such relation ceases.

Another object of this invention is to provide a can opener which will automatically cut a can end when the cutter is placed in cutting position with respect to the can and cease operating when the cutter is moved away from the can.

A further object of this invention is to provide a can opener of the kind described which will open cans of different sizes.

Still other objects and advantages of this invention will be apparent on reading this specification.

The preferred exemplification of the invention is illustrated in the accompanying drawings which form a part of this specification and in which like parts are indicated by like characters of reference.

Referring to the drawings:

Fig. 1 is a side elevation of the novel can opener with the parts in operative relation to a can.

Fig. 2 is a section on the line 2—2 of Fig. 1.

Fig. 3 is a section on line 3—3 of Fig. 1.

The preferred form of the invention comprises a base 11, which supports the rest of the device. Suitable means may be provided to attach it to a table, shelf or any other suitable object. Such attaching means may be conventional suction cup 12. The base 11 preferably has downwardly projecting flange 13 extending all around it. A turntable 14 is supported on the base 11 and is dish-shaped, having an upwardly projecting flange 16 extending all around it. The turntable has a downwardly projecting stub shaft 17 attached thereto centrally thereof which projects through a hole through the base 11. A nut or collar 18, attached to the shaft at the underside of the base, retains the turntable in place on the base. The base is formed to have a ball race 19, in which are balls 21 on which the turntable rests.

A post 22 is suitably attached to the base and projects vertically upwardly from it. A horizontal arm 23 is supported at adjustable elevations on the post 22 in such a manner that it can be swung about the arm to a sufficient degree for a purpose which will appear hereinafter. With this in view, the post 22 may have a series of horizontal slots 24 at different elevations so that a pin, carried by the arm 23, will fit into any of them. Such pin 26 extends through the arms 27 of a bracket 28 which is affixed to the arm 23, and has a handle 29. A coiled compression spring 31, between the arms 27, normally urges the pin 26 toward the post 22 and into any of the slots 24 that may be in line therewith. The pin can be retracted against the urging of the spring by means of the handle 29. The arm 23 can thus be adjusted to a suitable height and also to a suitable angular position since the pin can ride around in the respective slot.

The arm 23 carries a multiple speed geared electric motor 31, the different speeds of which are obtainable by moving a switch handle 32 which projects through a slot 33 in the motor casing 34. The movement of such switch handle is along a scale 36 having indicia for the different speeds. The motor drives a shaft 37 through its gearing (not shown). This shaft carries a cylindrical member 38 having grooves with sharp edges 39 on its cylindrical surface and sharp teeth 41 on top. A bell crank lever 42 is pivoted at 43 to the arm 23, one arm 44 of which terminates in a handle 46 and the other arm 47 of which has a rotary can cutter 48 rotatably attached thereto. The cutter 48 is opposite the member 38 when the handle 46 is in operating or down position, as shown in full lines in Fig. 1 and as also shown in Fig. 2.

The line 51, supplying power to the motor 31, leads to a switch box 52, and a line 53 runs from such switch box to the motor. The switch in the switch box is normally open and has a switch actuating member 54 projecting out from the box which closes the switch when pressed toward the box. This member 54 normally projects into the path of the down or operative position of the arm 47, so that when the handle 46 is moved to down or operative position it causes the cutter to assume its operative position and the switch to close to supply electric current to the motor.

When the can opener is not in use, the handle 46 is normally in its up or inoperative position shown in dotted lines in Figs. 1 and 2. Then to open a can 56 it is placed centrally on the turntable 14, the arm 23 is adjusted as to its height and its horizontal or angular position on the post 22, and the handle 46 is moved down. The angular position of the arm will depend on the diameter of the can which is to be opened. The procedure indicated closes the switch which supplies power to the motor as the cutter reaches cutting position. The motor, through its gearing, rotates the member 38, the sharp edges on its side and the sharp teeth on its top bite into the top of the side of the can and the underside of the lip of the can, respectively. The can is held between the member 38 and the cutter and is rotated by the former and cut by the latter, the turntable rotating with the can. Egg beaters, meat cutters or grinders, or other devices, may be substituted for the can opener; and then an additional switch 57 is provided to control the motor for operating the chosen other device.

While certain details have been referred to and illustrated for the purpose of explaining the invention, it is not necessarily limited thereby. Some of such details may be added to, modified, or omitted, without departing from the spirit of the invention, the scope of which is defined in the appended claim.

I claim:

A can opener comprising a base member, a turntable thereon, a post on the base member, the post having a vertical series of horizontal slots therein, a laterally projecting arm having a vertical opening therethrough, the post projecting through the opening of the arm, a bracket on the arm adjacent to the post and having legs projecting away from the arm, a latch member extending through the bracket legs and into a selected slot in the post, a spring to urge the latch member into a slot, the latch member having a handle to retract it, an electric motor on the arm, a normally open switch on the arm in the power circuit for the motor, a vertical shaft rotatable by the motor, a cylindrical can-rotating member on the vertical shaft and having vertical grooves with sharp edges on its cylindrical surface and sharp teeth on its top, a bell crank lever on the arm, an arm of the bell crank lever terminating in a handle, and a rotary cutter rotatably mounted on the other arm of the bell crank lever whereby it can be swung into and out of operative position adjacent said can-rotating member, the normally open switch having a member to close the switch on pressing it, the switch-closing member normally projecting into the position occupied by the cutter-carrying arm when the cutter is in operative position.

HALLETT E. CRAIG.

REFERENCES CITED

The following references are of record in the file of this patent:

UNITED STATES PATENTS

| Number | Name | Date |
| --- | --- | --- |
| 1,522,319 | Nolan | Jan. 6, 1925 |
| 1,939,349 | Holman | Dec. 12, 1933 |
| 2,003,931 | Gilbert | June 4, 1935 |
| 2,011,170 | Ames | Aug. 13, 1935 |
| 2,286,303 | Pearson | June 16, 1942 |
| 2,441,322 | Jager | May 11, 1948 |

FOREIGN PATENTS

| Number | Country | Date |
| --- | --- | --- |
| 430,764 | Germany | June 23, 1926 |